Patented July 3, 1951

2,559,503

UNITED STATES PATENT OFFICE 2,559,503

NITROGENOUS DERIVATIVES OF PETROLEUM SULFONIC ACIDS

John L. Harlan, Houston, Tex., assignor to Standard Oil Development Company, a corporation of Delaware No Drawing. Application September 14, 1945, Serial No. 616,456

3 Claims. (Cl. 260—504)

The present invention is directed to a novel method for producing useful compositions of matter.

The compositions of matter of the present invention are nitrogenous derivatives of petroleum sulphonic acid bodies, specifically such sulphonic acid bodies as are derived from petroleum boiling in the lubricating oil range. These compositions of matter are prepared by reacting petroleum sulphonic acid bodies with concentrated nitric acid. The product of this reaction is a nitro derivative of the sulphonic acid body. These nitro derivatives may be readily reduced by treatment with nascent hydrogen to amino derivatives. When the nitro sulphonates are reduced in an alkaline medium, the nitro sulphonate is first reduced to a primary amino sulphonate and then two molecules of the primary amino sulphonate condense through the amino radicals with the elimination of ammonia to form a secondary amine molecule containing two sulphonic acid bodies connected to a nitrogen atom. The hydrogen atom of the amino groups may be replaced by other radicals or substituents to produce a wide variety of products.

All the products of the present invention are surface active bodies when in solution. They are, therefore, useful in the various arts in which surface active agents are employed, as in the detergent art and the various arts utilizing wetting agents, emulsifying agents and demulsifying agents. These products are particularly useful for the demulsification of crude oil emulsions, such as the conventional water-in-oil emulsions obtained from producing wells. They are especially effective on the stubborn emulsions which collect in the bottoms of oil storage tanks. In these capacities the amino derivatives are more effective than the nitro derivatives which in turn are more effective than the sulphonic acid bodies per se.

In the following examples are described some of the compositions of the present invention and methods for their preparation:

Example I 1000 grams of crude sodium sulphonate from 75 Stock Phenol Extract acid oil (phenol extract of Coastal crude lubricating oil distillate having a viscosity of 75 seconds Saybolt at 100° F.) were acidified with 100 grams of concentrated sulphuric acid. The sodium sulphonate had the following approximate analysis: 27.6% sodium sulphonate, 1.4% sodium sulphate, 15.5% water and 56.6% oil. The acidified sulphonate was heated to 132° F., while stirring. Stirring was stopped and the mixture allowed to settle 30 minutes. After settling, 104 grams of acid water (69 ml.) were withdrawn and discarded. The acid water still contained the sulphuric acid, sodium sulphate and some iron impurities. The sulphonic acid layer (996 grams) was then treated with 170 grams of concentrated (70%) nitric acid (120 ml.). The acid was added slowly in 10 ml. portions. The first 20 ml. of acid added over a 20 minute period caused the temperature to rise from 90° F. to 126° F. with the production of a slight foam. After the foam subsided, six 10 ml. portions of nitric acid were added slowly, making a total of 80 ml. acid. The temperature remained between about 130 to 135° F. On stirring, the reaction of the nitric acid continued as indicated by a rise in temperature and foaming. After stirring for ten minutes, 40 ml. of nitric acid was added slowly making a total of 120 ml. acid or 170 grams. A slight rise in temperature occurred. After several hours of stirring the reaction mixture was heated to 160° F. At this higher temperature a separation into three phases occurred (1) an oil layer amounting to 460 grams, (2) a nitro sulphonate layer amounting to 640 grams, and (3) an acid water layer amounting to 64 grams. The oil layer and the acid water layer were withdrawn and discarded. The nitro sulphonic acid layer was then neutralized with about 128 grams of 50% NaOH solution. This sodium salt of the nitro sulphonate is an excellent demulsifier for crude oil water-in-oil emulsions. It is particularly suited for the resolution of the aged tank bottom emulsions which collect in the bottoms of oil storage tanks. It is more effective than the original sulphonate used on such emulsions.

Example II

The nitro sulphonate prepared in accordance with Example I was acidified with 200 grams of concentrated hydrochloric acid (36% HCl) and 20 grams of iron powder was added. The mixture was agitated for one day. Hydrogen was given off and the nitro group reduced to an amino group. On standing, an acid layer was separated, withdrawn and discarded. The amino sulphonic acids were then washed with two 100 ml. portions of saturated sodium chloride solution to remove iron chloride formed by the reaction. The washed amino sulphonic acids were then neutralized with 50% sodium hydroxide to a phenolphthalien end-point and diluted with 100 ml. 91% isopropanol. The inorganic salts were allowed to settle and the amino sulphonate layer decanted. This amino sulphonate is an excellent demulsifier for tank bottom emulsions and live oil emulsions. It is more effective than the original sulphonate or the nitro sulphonate.

Example III

Five hundred grams of a 50% aqueous solution of substantially pure sodium sulphonate derived from 75 Stock Phenol Extract acid oil was nitrated with 300 ml. of 70% nitric acid. The nitric acid was added slowly while stirring with a mechanical mixer. The reaction was vigorous after the addition of the first 120 ml. of acid. The balance of the acid was added slowly as the foam produced by the initial reaction subsided. Heat was liberated and nitric acid fumes were given off at the point of initial reaction. After the reaction of nitric acid and sulphonate was substantially complete, the added water was withdrawn and discarded. The nitro sulphonate layer was neutralized with 40% caustic solution. The sodium salt of the nitro sulphonate was then diluted with isopropanol and allowed to settle for several days. The clear alcoholic solution of nitro sulphonate was then decanted from the inorganic salts and evaporated to a concentration of 61% nitro sulphonate by weight. This material is an excellent demulsifier for crude oil emulsions.

Example IV

One hundred grams of nitro sulphonate as prepared in Example III was reduced to an amino sulphonate by means of zinc dust and sodium hydroxide solution. The sample of nitro sulphonate was placed in a one liter flask equipped with a mechanical stirrer. Two hundred milliliters of 50% sodium hydroxide solution and 50 grams of zinc dust were added. The mixture was stirred. During the first part of the reaction only hydrogen was given off. In the latter part of the reaction, ammonia gas was given off. This evolution of ammonia gas indicated a condensation of the amino radicals. Stirring was discontinued after the evolution of ammonia gas stopped. The reduced nitro sulphonate was decanted into a separatory funnel. The unreacted zinc was washed with isopropanol and the washings combined with the "amino sulphonate." The amino di-sulphonate was then acidified with hydrochloric acid to remove the zinc ion. The amino di-sulphonic acid was then washed with small portions of saturated salt solution and then neutralized with caustic solution. The alcoholic solution of the amino di-sulphonate was allowed to settle to precipitate the inorganic salts. The alcoholic solution was then evaporated to a concentration of 35% amino di-sulphonate. This amino di-sulphonate is particularly well adapted to the resolution of crude oil emulsions such as encountered in the Conroe Field (Montgomery County), Texas.

Example V

Seventy-five grams of anhydrous oil free sodium sulphonate derived from the treatment of medicinal white oil stock with fuming sulphuric acid was diluted with an equal part of distilled water and then nitrated with 25 ml. of 70% nitric acid. The reaction of nitric acid and sulphonate did not take place readily. The nitric acid caused a salting out of the inorganic salts and no exothermic reaction occurred. The aqueous acid was allowed to settle and it was then withdrawn and discarded. Fifty milliliters of concentrated nitric acid was then added. This mixture was stirred under a mechanical mixer for three hours, during which time the nitration took place very slowly. The reaction was assisted by the application of external heat to maintain a temperature of 125° F. At this temperature nitration took place very smoothly. After three hours the mixture was allowed to settle. The free acid which separated was pipetted off and discarded. The acid nitro sulphonate was then neutralized with 40% caustic solution and then diluted with a volume of 91% isopropanol. The inorganic salts were allowed to settle. The clear sodium salt of the nitro sulphonate in alcoholic solution was then evaporated to a concentration of 56.5% by weight. This material is an excellent material for the resolution of crude oil emulsions.

Example VI

A small portion of the sodium nitro sulphonate prepared in Example V was agitated with one tenth its volume of cyclohexylamine hydrochloride. The cyclohexylamine sulphonate so prepared was centrifuged to remove the sodium chloride formed by the double decomposition reaction.

The calcium and cyclohexylamine salts of the various sulphonate derivatives heretofore described are more oil soluble than the sodium salts. These more oil soluble salts can conveniently be used in conjunction with the more water soluble alkali metal salts for the resolution of oil-in-water emulsions with increased effectiveness.

The nitration according to the present invention is ordinarily carried out at a temperature between about 90° F. and 160° F. The nitric acid appears to react with the sulphonic acid body by splitting off a fraction of the hydrocarbon molecule, or side chain, and combining with the molecule at this point. This mechanism is suggested by the production of fatty acid by-products. The sulphonic acid group is not split off of the molecule. Analytical tests have failed to indicate any free sulphuric acid group resulting from the action of the nitric acid on the sulphonic acid bodies. It is believed that small amounts of nitro paraffins are produced by side reactions, but the nature of these side reactions has not been fully determined.

It will be understood that the foregoing examples do not establish any limits on the quantities of reagents used, the temperature, reaction time or reaction materials. They are for the purpose of illustration only.

The process for breaking petroleum emulsions by subjecting the latter to the action of a petroleum sulphonic acid body having an amino derivative attached to the hydrocarbon nucleus thereof, as disclosed herein, is specifically claimed in my copending application, Serial No. 616,457, filed September 14, 1945, now issued as Patent No. 2,454,382. Similarly the process for breaking petroleum emulsions by subjecting the latter to the action of a petroleum sulphonic acid body having a nitro group attached to the hydrocarbon nucleus thereof is specifically claimed in my copending application, Serial No. 29,403, filed May 26, 1948, as a division of the aforesaid Serial No. 616,457, and now issued as Patent No. 2,488,593.

The nature and objects of the present invention having been described and illustrated, what I desire to claim is:

1. A process for reducing a nitrogenous petroleum sulphonic acid body selected from the group consisting of nitrated petroleum sulphonic acids and aminated petroleum sulphonic acids, consisting of the step of agitating said nitrogenous body with metallic zinc and an alkali metal hydroxide solution for a time sufficient to cause evolution of ammonia and formation of an amino di-sulphonic acid body.

2. A process for producing amino di-sulphonic acid bodies from a nitrogenous, petroleum sulphonic acid body selected from the group consisting of nitrated petroleum sulphonic acids and aminated petroleum sulphonic acids, consisting of the steps of agitating said nitrogenous body with metallic zinc and an alkali metal hydroxide solution for a time sufficient to cause evolution of ammonia and formation of an amino di-sulphonic acid body, and continuing said agitation for additional time until evolution of said ammonia ceases.

3. A method which comprises reacting concentrated nitric acid with a petroleum sulphonic acid body at a temperature between about 90° and 160° F. to form a nitrated petroleum sulphonic acid body, agitating said nitrated sulphonic acid body with metallic zinc and an alkali metal hydroxide solution under conditions of the normal heat of reaction therewith, and thereby forming an amino di-sulphonic acid body.

JOHN L. HARLAN

REFERENCES CITED

The following references are of record in the file of this patent:

UNITED STATES PATENTS

| Number | Name | Date |
|---|---|---|
| 518,990 | Frasch | May 1, 1894 |
| 518,991 | Frasch | May 1, 1894 |
| 691,132 | Gerresheim | Jan. 14, 1902 |
| 1,549,136 | Lachman | Aug. 11, 1925 |
| 1,845,280 | Jaeger | Feb. 16, 1932 |
| 1,932,176 | Guenther | Oct. 24, 1933 |
| 1,944,300 | Ott et al. | Jan. 23, 1934 |
| 2,061,601 | Steik | Nov. 24, 1936 |
| 2,184,325 | Sweeney | Dec. 26, 1939 |
| 2,197,800 | Henke | Apr. 23, 1940 |
| 2,238,195 | Thompson | Apr. 15, 1941 |
| 2,245,190 | Griesinger | June 10, 1941 |
| 2,259,885 | Griesinger | Oct. 21, 1941 |
| 2,263,312 | Reed | Nov. 18, 1941 |
| 2,430,421 | Gage | Nov. 4, 1947 |